United States Patent
Griswold et al.

(10) Patent No.: US 11,021,169 B1
(45) Date of Patent: Jun. 1, 2021

(54) SYSTEMS AND METHODS FOR DETERMINING AND USING POSTED SPEED LIMITS FOR VEHICLES

(71) Applicant: SmartDrive Systems, Inc., San Diego, CA (US)

(72) Inventors: Jeffrey Griswold, San Diego, CA (US); Mark Freitas, San Diego, CA (US); Daniel Andrew Deninger, San Diego, CA (US); Alekh Vaidya, San Diego, CA (US); Nicholas Shayne Brookins, San Diego, CA (US); Jason Palmer, San Diego, CA (US); Reza Ghanbari, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 199 days.

(21) Appl. No.: 16/279,859

(22) Filed: Feb. 19, 2019

(51) Int. Cl.
*B60W 50/04* (2006.01)
*G06K 9/00* (2006.01)
*B60W 50/00* (2006.01)

(52) U.S. Cl.
CPC ....... *B60W 50/045* (2013.01); *G06K 9/00114* (2013.01); *B60R 2300/00* (2013.01); *B60W 2050/0077* (2013.01); *B60W 2050/046* (2013.01); *B60W 2555/60* (2020.02); *B60W 2556/50* (2020.02)

(58) Field of Classification Search
CPC .......... B60W 50/045; B60W 2556/50; B60W 2555/60; B60W 2050/0077; B60W 2050/046; G01N 2223/401; B60R 2300/00; G06K 9/00114
See application file for complete search history.

(56) References Cited

U.S. PATENT DOCUMENTS

| | | | |
|---|---|---|---|
| 7,183,942 B2 * | 2/2007 | Rock | G01C 21/3697 340/901 |
| 8,305,206 B2 * | 11/2012 | Miller | G08G 1/0962 340/441 |
| 8,890,717 B2 * | 11/2014 | McClellan | G08G 1/09675 340/936 |
| 9,500,491 B2 * | 11/2016 | Kratzsch | G01C 21/3602 |
| 9,744,905 B1 * | 8/2017 | Assam | G08G 1/096741 |
| 9,987,981 B1 | 6/2018 | Deyaf | |
| 10,627,831 B2 | 4/2020 | Hayes | |
| 10,683,017 B1 | 6/2020 | Kruse | |
| 10,684,390 B1 | 6/2020 | Wagstaff | |
| 10,754,336 B2 | 8/2020 | Akman | |
| 10,775,806 B2 | 9/2020 | Abari | |
| 2007/0260395 A1 | 11/2007 | Matsuoka | |
| 2012/0054028 A1 | 3/2012 | Tengler | |

(Continued)

*Primary Examiner* — Ig T An
(74) *Attorney, Agent, or Firm* — Esplin & Associates, PC

(57) ABSTRACT

Systems and methods to determine posted speed limits for vehicles and modify a centralized database of posted speed limits may manage the centralized database, receive, from a fleet of vehicles, requests to modify speed limits associated with roads, and modify the centralized database in accordance with the received requests for modification. Individual vehicles may compare a posted speed limit for a particular road as identified based on road-side image information with a previously stored speed limit from the centralized database for the same road in order to detect a discrepancy and transmit a request for a modification.

6 Claims, 5 Drawing Sheets

(56) References Cited

U.S. PATENT DOCUMENTS

| | | |
|---|---|---|
| 2013/0339098 A1 | 12/2013 | Looman |
| 2014/0229568 A1 | 8/2014 | Raffa |
| 2015/0356793 A1 | 12/2015 | Dietz |
| 2017/0238258 A1 | 8/2017 | Ramalho De Oliveira |
| 2018/0211546 A1 | 7/2018 | Smartt |
| 2019/0011931 A1 | 1/2019 | Selvam |
| 2019/0122552 A1 | 4/2019 | Chen |
| 2019/0179336 A1 | 6/2019 | Colijn |
| 2019/0186930 A1 | 6/2019 | Chen |
| 2019/0204097 A1 | 7/2019 | Starns |

* cited by examiner

SYSTEMS AND METHODS FOR DETERMINING AND USING POSTED SPEED LIMITS FOR VEHICLES

FIELD

The systems and methods disclosed herein are related to determining, comparing, and/or using posted speed limits for vehicles and modifying a centralized database of posted speed limits. In particular, individual vehicles from a fleet of vehicles may detect discrepancies between posted speed limits for particular roads with previously stored speed limits from the centralized database for the same roads.

BACKGROUND

Systems configured to record, store, and transmit video, audio, and sensor data associated with a vehicle, e.g. to monitor the speed of a vehicle, are known. Such systems may compare the current vehicle speed to a database of known speed limits. Such a comparison may be based on the current location of the vehicle.

SUMMARY

One aspect of the disclosure relates to a system configured to determine posted speed limits for vehicles and modify a centralized database of posted speed limits. The system may be configured to couple with a fleet of vehicles. The fleet of vehicles may include a first vehicle operated by a first vehicle operator, a second vehicle operated by a second vehicle operator, a third vehicle operated by a third vehicle operator, and so forth. The system may include a remote computing server and/or other components. The remote computing server may include one or more processors and/or other components. In some implementations, the remote computing server may be separate and discrete from the fleet of vehicles. The one or more processors may be configured via machine-readable instructions to manage the centralized database of posted speed limits for vehicles, to transmit at least a portion of the centralized database to a first transceiver coupled to the first vehicle, to receive a first request to modify the centralized database, and to modify the centralized database in accordance with the first request. The centralized database of posted speed limits may include a geographical map of a set of roadways. The set of roadways may include a first road and/or other roads. Individual roadways in the set of roadways may be associated with road-specific information, and/or other information. The road-specific information may include speed limits and/or other information. The first road may be associated with a first speed limit. The transmitted portion of the centralized database of posted speed limits for vehicles may include the first speed limit associated with the first road. The first transceiver may be configured to transfer and/or receive information to and from the first vehicle and the remote computing server. The first request may be received from the first transceiver coupled to the first vehicle. The first request may be to modify, in the centralized database of posted speed limits for vehicles, the first speed limit that is associated with the first road. The first request may be based on a first detection, by a first set of resources carried by the first vehicle, of a discrepancy between (i) the first speed limit, and (ii) a first identification of a posted speed limit at a first location that corresponds to the first road. The first set of resources may include a first image sensor and a first user interface. The first image sensor may be configured to capture road-side image information around the first vehicle. The first user interface may be configured to receive user input from the first vehicle operator. The first identification of the posted speed limit may be based on at least one of (i) the road-side image information captured by the first image sensor of the first set of resources as the first vehicle traversed the first road, and (ii) the user input received from the first vehicle operator through the first user interface. In some implementations, responsive to receipt of the first request to modify the first speed limit that is associated with the first road, the first speed limit may be modified in accordance with the first request into a modified first speed limit.

One aspect of the disclosure relates to a system configured to compare posted speed limits for vehicles and modify a centralized database of posted speed limits. In some implementations, the system may be configured to couple with a first vehicle that is operated by a first vehicle operator. The system may include a geolocation sensor, an image sensor, a first transceiver carried by the first vehicle, one or more processors, and/or other components. The geolocation sensor may be configured to generate geographical signals conveying geographical information related to the first vehicle. The image sensor may be configured to capture image signals conveying road-side image information around the first vehicle. The first transceiver may be configured to transfer and receive information to and from the first vehicle and a remote computing server that is separate and discrete from the first vehicle. The one or more processors may be configured via machine-readable instructions to determine the geographical information, to determine the road-side image information around the first vehicle, to associate the road-side image information with the geographical information, to receive at least a first portion of the centralized database of posted speed limits, to identify a posted speed limit, to compare the posted speed limit as identified with the first speed limit as associated with the first road, to detect whether a discrepancy exists between the posted speed limit and the first speed limit, and to transmit information related to the discrepancy to the remote computing server, implying a request to modify the first speed limit associated with the first road. In some implementations, determining the geographical information related to the first vehicle may be based on the geographical signals. In some implementations, determining the road-side image information around the first vehicle may be based on the image signals. In some implementations, the centralized database of posted speed limits may include a geographical map of a set of roadways and/or other information. The set of roadways may include a first road and/or other roads. Individual roadways in the set of roadways may be associated with road-specific information and/or other information. The road-specific information may include speed limits and/or other information. The first road may be associated with a first speed limit. In some implementations, identifying the posted speed limit may be based on the road-side image information. In some implementations, identifying the first location of the posted speed limit may be based on the geographical information associated with the road-side image information. The first location may correspond to the first road. In some implementations, detecting whether a discrepancy exists between the posted speed limit and the first speed limit may be based on a comparison. In some implementations, discrepancy information that reflects the discrepancy may be generated responsive to the discrepancy existing. In some implementations, transmission of the discrepancy information to the remote computing server may imply a request to modify, in the centralized database of posted speed limits for vehicles, the first speed limit associated with the first road.

One aspect of the disclosure relates to a method for determining posted speed limits for a fleet of vehicles and modifying a centralized database of posted speed limits. The fleet of vehicles may include a first vehicle and/or other vehicles. The method may include managing the centralized database of posted speed limits for vehicles. The centralized database of posted speed limits includes a geographical map of a set of roadways. The set of roadways includes a first road. Individual roadways in the set of roadways are associated with road-specific information. The road-specific information includes speed limits. The first road is associated with a first speed limit. The method further includes transmitting, to a first transceiver coupled to the first vehicle, at least a portion of the centralized database of posted speed limits for vehicles. The portion includes the first speed limit associated with the first road. The method further includes receiving, from the first transceiver coupled to the first vehicle, a first request to modify, in the centralized database of posted speed limits for vehicles, the first speed limit that is associated with the first road. The first request is based on a first detection, by a first set of resources carried by the first vehicle, of a discrepancy between (i) the first speed limit as transmitted, and (ii) a first identification of a posted speed limit at a first location that corresponds to the first road. The first set of resources includes a first image sensor configured to capture road-side image information around the first vehicle and a first user interface configured to receive user input from the first vehicle operator. The first identification of the posted speed limit is based on at least one of (i) the road-side image information captured by the first image sensor of the first set of resources as the first vehicle traversed the first road, and (ii) the user input received from the first vehicle operator through the first user interface. The method further includes, responsive to receipt of the first request to modify the first speed limit that is associated with the first road, modifying the first speed limit in accordance with the first request into a modified first speed limit.

One aspect of the disclosure related to a method for comparing posted speed limits for a fleet of vehicles and modifying a centralized database of posted speed limits. The fleet of vehicles may include a first vehicle operated by a first vehicle operator. The method may include generating, by a geolocation sensor carried by the first vehicle, geographical signals conveying geographical information related to the first vehicle. The method may further include capturing, by an image sensor carried by the first vehicle, image signals conveying road-side image information around the first vehicle. The method may further include determining the geographical information related to the first vehicle, wherein the geographical information is based on the geographical signals. The method may further include determining the road-side image information around the first vehicle, wherein the road-side image information is based on the image signals. The method may further include associating the road-side image information with the geographical information. The method may further include receiving, from a remote computing server that is separate and discrete from the first vehicle, at least a first portion of the centralized database of posted speed limits, wherein the centralized database of posted speed limits includes a geographical map of a set of roadways, wherein the set of roadways includes a first road, wherein individual roadways in the set of roadways are associated with road-specific information, wherein the road-specific information includes speed limits, wherein the first road is associated with a first speed limit. The method may further include identifying a posted speed limit, wherein identification of the posted speed limit is based on the road-side image information. The method may further include identifying a first location of the posted speed limit, wherein identification of the first location is based on the geographical information associated with the road-side image information, wherein the first location corresponds to the first road. The method may further include comparing the posted speed limit as identified with the first speed limit as associated with the first road. The method may further include detecting whether a discrepancy exists between the posted speed limit and the first speed limit, wherein detection is based on the comparison, The method may further include, responsive to the discrepancy existing, generating discrepancy information that reflects the discrepancy. The method may further include transmitting, through the first transceiver, the discrepancy information to the remote computing server, wherein transmission of the discrepancy information implies a request to modify, in the centralized database of posted speed limits for vehicles, the first speed limit associated with the first road.

Individual vehicles may include a set of sensors configured to generate output signals conveying information related to the operation of the individual vehicles, the surroundings of individual vehicles, and/or other information. As used herein, transmission and/or distribution of information may be considered a data processing function. As used herein, the terms data and information may be used interchangeably. As used herein, the terms "remote computing server" and "centralized server" may be used interchangeably.

The system may include one or more processors and/or other mechanisms/components for processing information. For example, a set of resources included in and/or carried by an individual vehicle may include one or more processors. For example, the remote computing server may include one or more processors. In some implementations, other vehicle-specific components, such as, by way of non-limiting example, a vehicle event recorder, may include one or more processors. In some implementations, some or all of the processors may be configured via machine-readable instructions to perform various functions. As used herein, the term "processor" may be used interchangeably with the term "physical processor."

A set of resources included in and/or carried by an individual vehicle may include one or more processors, electronic storage, a transceiver, and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of the system, including but not limited to other vehicles (or components carried by other vehicles), the remote computing server, and/or other components. In some implementations, transceivers may be configured to transfer and/or receive information wirelessly, and/or otherwise provide resources for the distribution of information. For example, a transceiver may be configured to receive executable code, queries, and/or other information. For example, a transceiver may be configured to transmit results from executable code, responses to queries, and/or other information, e.g., to a remote computing server. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

The sensors of a particular vehicle may be referred to as a set of sensors. A set of sensors may be carried by an individual vehicle. A set of sensors may be configured to generate output signals conveying information. In some implementations, the generated information may be related to one or both of the operation of one or more vehicles and the surroundings of one or more vehicles. The generated information may include timing information, location information, (vehicle) operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, location information, operator information, and/or other information, e.g. in electronic storage.

In some implementations, a sensor may be configured to generate output signals conveying information related to the operation of a vehicle (which may include information related to one or more operating conditions of the vehicle). Information related to the operation of the vehicle may include (feedback) information from one or more of the mechanical systems of the vehicle, and/or other information. In some implementations, at least one of the sensors may be a vehicle system sensor included in an engine control module or electronic control module (ECM) system of the vehicle. An individual sensor may be vehicle-specific.

Individual sensors may be configured to generate output signals conveying information, e.g., vehicle-specific information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a geolocation sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

As mentioned, individual sensors may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

In some implementations, the system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet.

The remote computing server may include one or more processors. The remote computing server may be remote, separate, and/or discrete from the fleet of vehicles. The one or more processors may be configured via machine-readable instructions to perform various functions. The remote computing server may be configured to facilitate presentation of a user interface to a user of the remote computing server, including but not limited to a third party using the remote computing server to query the fleet of vehicles. As used herein, the term "third party" may refer to an entity that neither owns nor operates the fleet of vehicles and neither owns nor operates the remote computing server. The user interface may be configured to facilitate interaction between one or more users and the remote computing server. For example, the user interface may be configured to receive user input, executable code, and/or other information from a user. The remote computing server may be further configured to transmit information based on received user input, received executable code, and/or other received information to some vehicles in the fleet or to all vehicles of the fleet. Information from individual vehicles, including but not limited to responses, results and/or other information generated by individual vehicles, may be transferred to, received by, and processed, analyzed, and/or presented by the remote computing server.

In some implementations, a set of resources included in and/or carried by an individual vehicle may include an event recorder (also referred to as vehicle event recorder). An event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information. In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events and/or other information related to the operation of a vehicle in real-time or near real-time during operation of a vehicle. In some implementations, an event recorder may identify vehicle events and/or other information related to the operation of a vehicle based on previously stored information. For example, the previously stored information may be based on output signals generated days, weeks, months or more ago.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers or combinations thereof. Some types of vehicle events may be based on the actions or motion of the vehicle itself. Other types of vehicle events may be based on the actions taken or performed by a vehicle operator. Some types of vehicle events may be based on a combination of both the actions or motion of the vehicle itself and the actions taken or performed by a vehicle operator. For example, a particular vehicle event may include hard braking followed (within a predetermined window of time) by a sharp turn and/or swerve. This particular vehicle event may indicate a near-collision that was severe enough that the vehicle operator decided that merely braking hard would not be sufficient to avoid the collision. Another example of a vehicle event that includes a combination of actions may be a lane change followed (within a predetermined window of time) by hard braking, which may indicate a poor decision to initiate the lane change.

The one or more processors of the remote computing server and/or of individual sets of resources may be configured to execute one or more computer program components. The computer program components may include one or more of a database management component, a database transmission component, a modification request component, a database modification component, an event receipt component, an event modification component, a parameter determination component, a local database component, a local identification component, a discrepancy component, a presentation component, an interface component, a local event component, and/or other components.

The database management component may be configured to manage the centralized database of posted speed limits for vehicles. In some implementations, the centralized database may include a geographical map of a set of roadways. The set of roadways may include a first road, a second road, a third road, and so forth. Individual roadways in the set of roadways may be associated with road-specific information. The road-specific information may include speed limits.

The database transmission component may be configured to transmit at least a portion of the centralized database of posted speed limits to transceivers that are coupled to vehicles. For example, the transceivers may include a first transceiver coupled to a first vehicle, a second transceiver coupled to a second vehicle, and so forth. The transceiver may be configured to transfer and receive information to and from individual vehicles and the remote computing server. In some implementations, transmission may be wireless. In some implementations, transmission may be point-to-point. In some implementations, transmission may be broadcast. In some implementations, transmission may be bi-directional.

The modification request component may be configured to receive requests and/or other information from transceivers and/or vehicles. For example, the modification request component may be configured to receive a first request from the first transceiver. For example, the first request may be to modify a particular speed limit associated with a particular road.

The database modification component may be configured to modify a particular speed limit in the centralized database for a particular road. For example, a modification may be performed in accordance with a received request for a modification.

The event receipt component may be configured to receive vehicle event records and/or other information from transceivers and/or vehicles. For example, a vehicle event record may be related to a detected vehicle event, including but not limited to a speeding event.

The event modification component may be configured to modify and/or annotate information, including but not limited to received vehicle event records.

The parameter determination component may be configured to determine parameters and/or other information, including but not limited to current operating conditions and/or vehicle parameters. For example, a parameter may be determined based on generated and/or captured signals from (image) sensors. In some implementations, the parameter determination component may be configured to associate different parameters and/or other information with each other. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The local database component may be configured to receive at least a portion of a centralized database of posted speed limits, e.g., from the remote computing server.

The local identification component may be configured to identify posted speed limits. In some implementations, identification of posted speed limits may be based on image information, including but not limited to road-side image information.

The discrepancy component may be configured to compare speed limits from the centralized database of posted speed limits with identified speed limits, e.g., for the same road. In some implementations, the discrepancy component may be configured to detect whether a discrepancy exists between different speed limits, e.g., based on a comparison. In some implementations, the discrepancy component may be configured to generate notifications and/or discrepancy information that reflects a detected discrepancy. In some implementations, discrepancy information and/or other information may be transmitted to the remote computing server.

The presentation component may be configured to facilitate presentation of information to vehicle operators. For example, a vehicle operator may be presented with a notification regarding a detected discrepancy. In some implementations, the vehicle operator may be requested to confirm, e.g., in response to the presented notification, whether the detected discrepancy appears legitimate. In some implementations, a reviewer (e.g., a user of a remote computing server) may be requested to confirm, e.g., in response to the presented notification, whether the detected discrepancy appears legitimate. In some implementations, the vehicle operator may request that a reviewer confirms, e.g., in response to a presented notification, whether the detected discrepancy appears legitimate. In some implementations, the presentation component may be configured to facilitate presentation of user interfaces, reports, and/or results to users, third parties, and/or vehicle operators. In some implementations, the presentation component may facilitate presentation of a user interface to a user of the remote computing server. In some implementations, the presentation component may facilitate presentation of one or more user interfaces to one or more vehicle operators. In some implementations, the presentation component may facilitate presentation of one or more reports, results, and/or user interfaces to a third party.

The interface component may be configured to facilitate interaction between the system and a vehicle operator. For example, the interface component may facilitate interaction through user interfaces. For example, the interface component may receive user input through a user interface. In some implementations, the interface component may receive user input from the user of a remote computing server. In some implementations, the interface component may receive user input from vehicle operators. In some implementations, the interface component may receive user input from a third party.

The local event component may be configured to detect vehicle events, including but not limited to speeding events. In some implementations, vehicle events may be related to current operating conditions of a vehicle. In some implementations, vehicle events may be related to the surroundings of a vehicle. In some implementations, vehicle events may be related to the operator of a vehicle. For example, a vehicle event may be based on comparing one or more vehicle parameters with one or more thresholds.

In some implementations, one or more components of the system may be configured to obtain, receive, and/or determine contextual information related to environmental conditions near and/or around vehicles. Environmental conditions may be related to weather conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, roads, speed limits, images, locations, vehicle events, operating conditions, parameters, thresholds, functions, notifications, discrepancies, location-specific features, requests, modifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
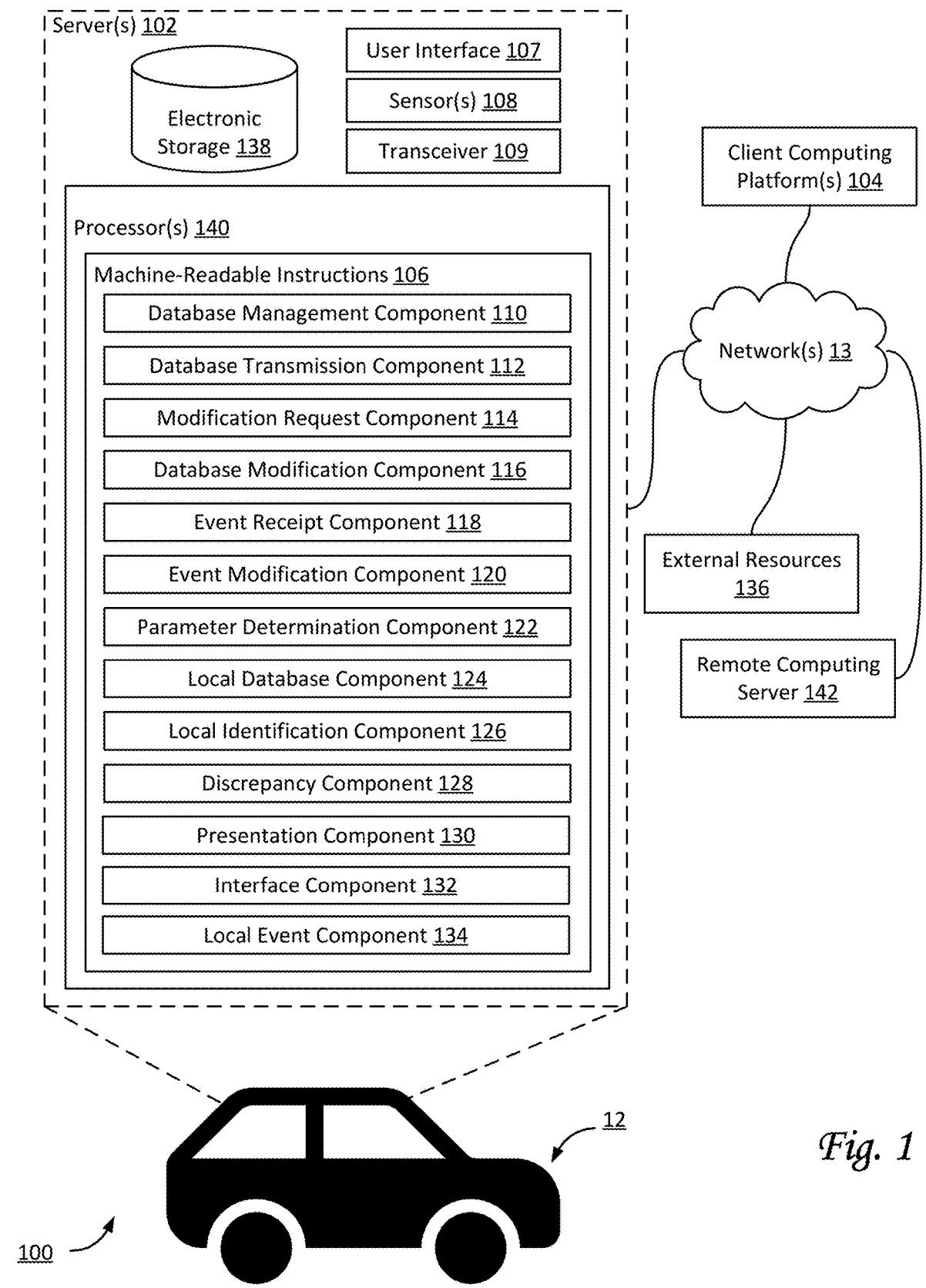
FIG. 1 illustrates a system configured to determine and/or compare posted speed limits for vehicles and modify a centralized database of posted speed limits, in accordance with one or more embodiments.

FIG. 1 illustrates a system 100 configured to determine and/or compare posted speed limits for vehicles and modify a centralized database of posted speed limits. In some implementations, system 100 may be configured to couple with a fleet of vehicles. The fleet may include a vehicle 12 and/or other vehicles. In some implementations, system 100 may be configured to couple with vehicle 12 that is operated by a vehicle operator. As used here, the term fleet may refer to a set of at least 5 vehicles, at least 10 vehicles, at least 100 vehicles, at least 1000 vehicles, and/or another number of vehicles. Individual vehicles may include a set of resources for data processing and/or electronic storage, including but not limited to persistent storage. Individual vehicles may include a set of sensors configured to generate output signals conveying information, e.g., related to the operation of the individual vehicles.

System 100 may include one or more of vehicle 12, a server 102, electronic storage 138, a user interface 107, sensor(s) 108, transceiver 109, processor(s) 140, client computing platform(s) 104, external resources 136, a remote computing server 142, and/or other components. In some implementations, system 100 and/or remote computing server 142 may be a distributed data center, include a distributed data center, or act as a distributed data center.

One or more components of system 100 may include one or more processors 140 and/or other mechanisms/components for processing information. For example, a set of resources included in and/or carried by an individual vehicle may include one or more processors. For example, remote computing server 142 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 138 and/or other mechanisms/components for storing information. For example, a set of resources included in and/or carried by an individual vehicle may include electronic storage. For example, remote computing server 142 may include electronic storage. In some implementations, other vehicle-specific components, such as, by way of non-limiting example, a vehicle event recorder, may include electronic storage.

Transceiver 109 may be configured to transfer and/or receive information to and/or from other elements of system 100, including but not limited to other vehicles (or components carried by other vehicles in a fleet of vehicles), remote computing server 142, and/or other components. In some implementations, transceivers may be configured to transfer and/or receive information wirelessly, and/or otherwise provide information-distribution resources. For example, in some implementations, a particular transceiver may be configured to receive executable code, such as code that includes and/or represents a definition of a particular vehicle event, a particular maneuver of a vehicle, and/or a particular condition of a vehicle operator of a vehicle. In some implementations, transceivers may be configured to obtain, receive, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

Referring to FIG. 1, sensor(s) 108 may be configured to generate output signals conveying information. In some implementations, the generated information may be related to the operation of one or more vehicles in the fleet of vehicles. In some implementations, the generated information may be related to the surroundings of one or more vehicles. Sensors 108 may form a set of sensors. An individual set of sensors may be carried by an individual vehicle. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_2$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources of vehicle 12 may be configured to store generated information, timing information, location information, operator information, and/or other information, e.g. in electronic storage 138. In some implementations, information may be stored after compression, filtering, and/or other processing to reduce the required amount of storage space.

Sensor(s) 108 may be configured to generate output signals conveying information related to the operation of a vehicle. Information related to the operation of a vehicle may include (feedback) information from one or more of the mechanical systems of the vehicle, and/or other information. In some implementations, at least one of the sensors may be a vehicle system sensor included in an engine control module or electronic control module (ECM) system of the vehicle. The sensors of a particular vehicle may be referred to as a set of sensors. An individual sensor may be vehicle-specific.

Information related to current operating conditions of a vehicle may include (feedback) information from one or more of the mechanical systems of the vehicle, the electrical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the interior of the vehicle (e.g., the cabin) and/or a 360-degree view of the exterior of the vehicle.

In some implementations, sensor(s) 108 may be configured to generate output signals conveying information. The information may include visual information, motion-related information, position-related information, biometric information, heat-related information, infra-red information, and/or other information. In some implementations, one or more components of system 100 may determine one or more parameters that are measured, derived, estimated, approximated, and/or otherwise determined based on one or more output signals generated by sensor(s) 108.

Output signals generated by individual sensors 108 (and/or information based thereon) may be stored and/or transferred in electronic files. In some implementations, output signals generated by individual sensors 108 (and/or information based thereon) may be streamed to one or more other components of system 100.

In some implementations, sensor(s) 108 may include image sensors, cameras, and/or other sensors. Individual sensors may be configured to capture information, including but not limited to visual information, video information, audio information, heat information, geolocation information, orientation and/or motion information, depth information, and/or other information. Information captured by one or more sensors 108 may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 13. The one or more networks 13 may, by way of non-limiting example, include the internet.

Remote computing server 142 may include one or more processors, including but not limited to processor(s) 140. Remote computing server 142 may be remote, separate, and/or discrete from the fleet of vehicles. Remote computing server 142 may be physically unconnected to any vehicle in the fleet. One or more processors 140 may be configured via machine-readable instructions 106 to perform various functions. Remote computing server 142 may be configured to facilitate presentation of user interfaces, including but not limited to user interface 107, to one or more users of remote computing server 142. In some implementations, users of remote computing server 142 may include one or more reviewers. For example, a reviewer may manually and/or visually review certain vehicle events and/or other occurrences of interest, including but not limited to discrepancies between posted speed limits for particular roads with previously stored speed limits from the centralized database for the same roads.

User interface 107 may be configured to facilitate interaction between one or more users and remote computing server 142. For example, user interface 107 may be configured to receive user input from a user. In some implementations, the received input may represent executable code, which may include one or more queries, definitions, and/or algorithms for particular vehicle events, particular maneuvers of vehicles, and/or particular conditions of vehicle operators. In some implementations, the received input may represent a query, e.g. a distributed query. The query may be related to information stored on electronic storage 138, e.g. in multiple sets of resources of multiple vehicles. Alternatively, and/or simultaneously, a query may be related to one or more vehicle operators. Remote computing server 142 may be further configured to transmit information (e.g., executable code, and/or a query) to some vehicles in the fleet or to all vehicles of the fleet. Results and/or other responses from individual vehicles may be received, aggregated, and/or presented by remote computing server 142.

In some implementations, an event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information (e.g. through use of a transceiver such as transceiver 109). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. In some implementations, detections by the event recorder may be based, at least in part, on information included in executable code and/or other received information. An event recorder may identify vehicle events in real-time or near real-time during operation of a vehicle.

Referring to FIG. 1, one or more processors 140 may be configured to execute one or more computer program components. The computer program components may include one or more of a database management component 110, a database transmission component 112, a modification request component 114, a database modification component 116, an event receipt component 118, an event modification component 120, a parameter determination component 122, a local database component 124, a local identification component 126, a discrepancy component 128, a presentation component 130, an interface component 132, a local event component 134, and/or other components.

Database management component 110 may be configured to manage a centralized database of posted speed limits for vehicles. In some implementations, the centralized database may include a geographical map of a set of roadways and/or other information. The set of roadways may include a first road, a second road, a third road, and so forth. Individual roadways in the set of roadways may be associated with road-specific information and/or other information. The road-specific information may include speed limits and/or other information. For example, in some implementations, road-specific information may include information regarding the surface of the road, whether the road is intended for car-pooling, and/or other information.

Database transmission component 112 may be configured to transmit at least a portion of the centralized database of posted speed limits to transceivers that are coupled to vehicles. For example, the transceivers may include transceiver 109 coupled to vehicle 12, a second transceiver coupled to a second vehicle, and so forth. The transceiver 109 may be configured to transfer and receive information to and from individual vehicles and the remote computing server. In some implementations, transmission may be wireless. In some implementations, transmission may be point-to-point. In some implementations, transmission may be broadcast. In some implementations, transmission may be bi-directional. In some implementations, one or more transmissions may occur responsive to modifications of the centralized database.

Modification request component 114 may be configured to receive requests and/or other information from transceivers and/or vehicles. For example, modification request component 114 may be configured to receive a first request from transceiver 109 and/or vehicle 12. For example, the first request may be to modify a particular speed limit associated with a particular road. In some implementations, requests received by modification request component 114 may be generated by and/or based on activities performed by other components of system 100, including but not limited to discrepancy component 128. For example, discrepancy information transmitted by discrepancy component 128 to remote computing server 142 may include and/or imply a request to modify information in the centralized database.

Database modification component 116 may be configured to modify a particular speed limit in the centralized database for a particular road. For example, a modification may be performed in accordance with a received request for a modification.

Event receipt component 118 may be configured to receive vehicle event records and/or other information from transceivers and/or vehicles. For example, a vehicle event record may be related to a detected vehicle event, including but not limited to a speeding event.

Event modification component 120 may be configured to modify and/or annotate information, including but not limited to received vehicle event records. For example, a vehicle event record that indicates a speeding event may be modified and/or annotated if the pertinent speed limit for the pertinent road was modified, e.g. by a modification such that the event no longer qualifies as speeding. For example, a first vehicle may have identified a posted speed limit in a particular location that is higher than the posted speed limit according to the centralized database. A second vehicle may cause a vehicle event record to be generated that includes a speeding event at the same particular location. Event modification component 120 may be configured to modify and/or annotate the vehicle event record for the second vehicle based on at least the identified posted speed limit by the first vehicle. In some implementations, event modification component 120 may be configured to modify and/or annotate one or more consequences that occurred due to the vehicle event record for the second vehicle. For example, a particular consequence may be penalty for speeding. In some implementations, event modification component 120 may be configured to delete outdated vehicle event records, and/or one or more consequences of the detection of a speeding event.

Parameter determination component 122 may be configured to determine parameters and/or other information, including but not limited to current operating conditions and/or vehicle parameters. For example, a parameter may be determined based on generated and/or captured signals from (image) sensors, geolocation sensors, and/or other sensors. In some implementations, parameter determination component 122 may be configured to associate different parameters and/or other information with each other. For example, image information may be associated with geographical information. In some implementations, parameter determination component 122 may be configured to determine one or more of the current operating conditions one or more times in an ongoing manner during operation of the vehicle. In some implementations, parameter determination component 122 may be configured to determine one or more of the parameters one or more times in an ongoing manner during operation of the vehicle. In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters. The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical features.

In some implementations, the geographical information as determined by, e.g., parameter determination component 122 may be incorrect and/or otherwise form the basis for a mistake in determining the current road being traversed by vehicle 12. For example, a first and a second road may be close to each other, and system 100 may mistakenly determine vehicle 12 is traversing the second road while in actuality vehicle 12 is traversing the first road, and/or vice versa. In some implementations, the first and second road may be associated with different posted speed limits, e.g., in the centralized database. In some implementations, system 100 may be configured to determine whether the first and second road are within a particular proximity of each other. For example, the likelihood of mistaking the first road for the second road or vice versa may be greater if both roads are closer to each other. System 100 may be configured to determine a first history of recent locations and/or roads traversed. System 100 may be configured to determine a second history of recent speeds of vehicle 12. System 100 may be configured to determine whether a mistake has been made in determining the current road being traversed by vehicle 12 based on one or more of the first history, the second history, and/or other information. By way of non-limiting example, vehicle 12 in scenario 50 of FIG. 5 may mistakenly determine vehicle 12 is on the same particular road as vehicle 12c. However, based on one or more of the first history, the second history, and/or other information, vehicle 12 may determine a mistake has been made and/or vehicle 12 is actually on a different road than vehicle 12c. In some implementations, a similar analysis may be used to determine that an identified posted speed limit, such as a speed limit of 30 mph due to a sign 41c in FIG. 5, should be associated with a different road than the road currently being traversed by vehicle 12. In other words, the identified speed limit may belong to a different road.

Referring to FIG. 1, local database component 124 may be configured to receive at least a portion of a centralized database of posted speed limits, e.g., from the remote computing server 142. In some implementations, the received portion may be determined based on the current location of a particular vehicle.

Local identification component 126 may be configured to identify and/or otherwise determine posted speed limits. In some implementations, identification of posted speed limits may be based on image information, including but not limited to road-side image information. In some implementations, identification and/or recognition of particular content within image information may rely on computer vision techniques, object recognition, image analysis, comparisons with templates, signal-processing techniques, computer learning through artificial intelligence, and other automated techniques. In some implementations, the particular set of techniques used to accomplish the identification may be based, at least in part, on the current location. For example, different states in the United States of America may used slightly different designs and/or formats for different types of road-side signs and/or types of signage painted on the road. Similarly, other countries may use specific designs and/or formats for different types of signs pertaining to speed limits.

Alternatively, and/or simultaneously to identification of posted speed limits based on image information, in some implementations, identification may be based at least in part on user input received from vehicle operators and/or reviewers. For example, user input may be used to confirm an (automated) identification based on image information. For example, confirmation by vehicle operators may be contemporaneous, whereas confirmation by remote reviewers may be done later and/or off-line. In some implementations, requests from vehicle operators for review by one or more remote reviewers may be granted or denied based on previously performed reviews. For example, if a reviewer has recently reviewed discrepancies in a particular area (say, for discrepancies in the past day, or week, or month), additional and/or new request pertaining to the same area may be denied. However, once the most recent review is older than, say, one, two, four, six, or eight weeks, an additional and/or new request may be granted.

Figure 4:
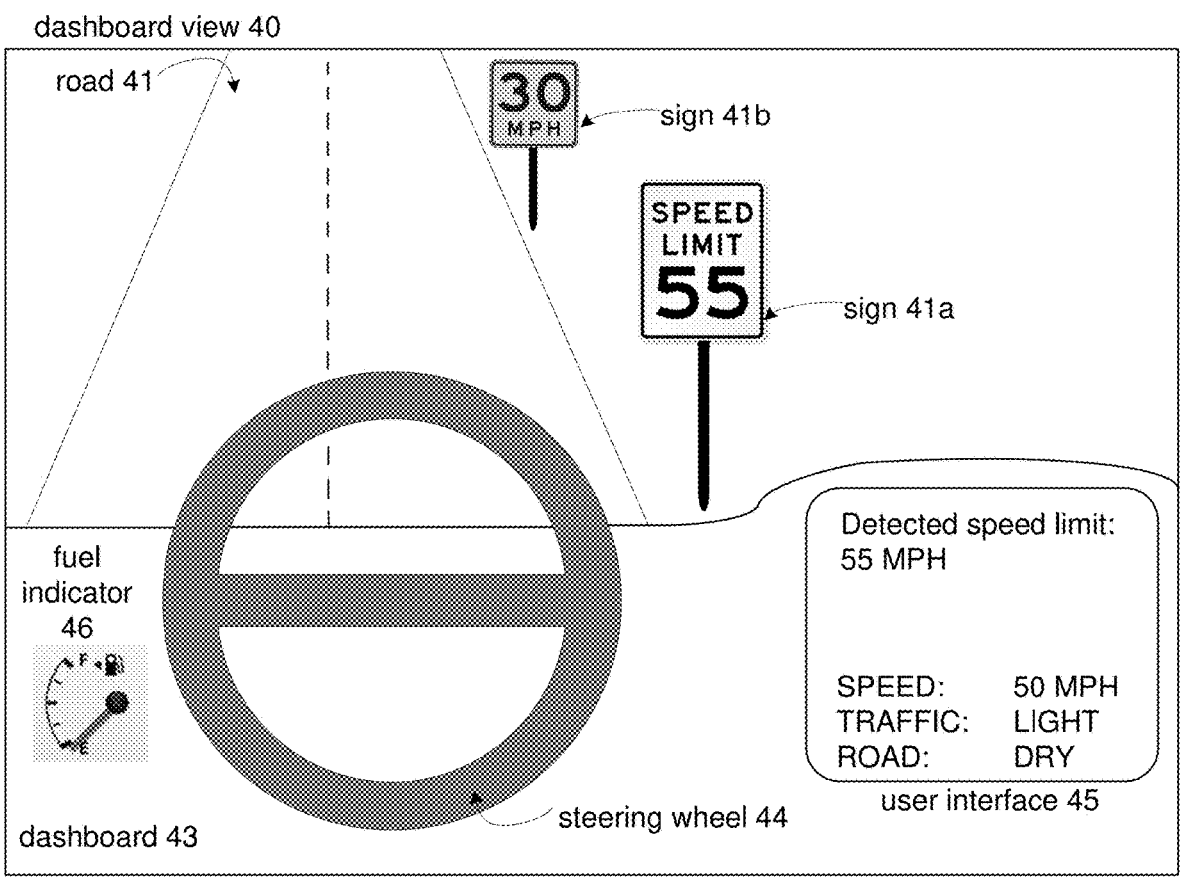
FIG. 4 illustrates an exemplary dashboard view of a scenario in which a system can be used that is configured to determine and/or compare posted speed limits for vehicles and modify a centralized database of posted speed limits, in accordance with one or more embodiments.

By way of non-limiting example, FIG. 4 illustrates an exemplary dashboard view 40 of a scenario in which system 100 can be used by a particular vehicle. Dashboard view 40 includes a dashboard 43 and a view of a road 41. Dashboard 43 may include a fuel indicator 46, a steering wheel 44, and a user interface 45. Road 41 may include, along the roadside, a first sign 41a and a second sign 41b. The particular vehicle may include an image sensor configured to capture image signals conveying road-side image information near the particular vehicle. The road-side image information may include image information representing first sign 41a and/or second sign 41b. For example, first sign 41a may have a black-and-white design, whereas second sign 41b may include black text on a yellow background. Additionally, the particular vehicle may include a geolocation sensor configured to generate geographical signals conveying geographical information, in particular the current location of the particular vehicle. Local identification component 126 may be configured to identify a particular posted speed limit based on the captured image information representing first sign 41a. In some implementations, local identification component 126 may be configured to distinguish a particular posted speed limit (e.g., first sign 41a) from a recommended speed limit (e.g., second sign 41b conveying a recommended speed limit of 30 mph). For example, analysis of captured image signals may reveal that an object on the side of the road is actually (or probably) a road sign (i.e., first sign 41a) that conveys a speed limit of 55 mph. Based on the current location of the particular vehicle and/or first sign 41a, the system may be configured to compare this posted speed limit of 55 mph with the content of a centralized database of posted speed limits for the same road and/or the same current location.

Referring to FIG. 1, discrepancy component 128 may be configured to compare speed limits from the centralized database of posted speed limits with identified speed limits, e.g., for the same road. In some implementations, the discrepancy component may be configured to detect whether a discrepancy exists between different speed limits, e.g., based on a comparison. In some implementations, discrepancy component 128 may be configured to generate notifications and/or discrepancy information that reflects a detected discrepancy. In some implementations, discrepancy information and/or other information may be transmitted to the remote computing server. For example, transmitted discrepancy information may be received by modification request component 114 and may include and/or imply a request to modify information in the centralized database.

Presentation component 130 may be configured to facilitate presentation of information to vehicle operators and/or other users. For example, a vehicle operator may be presented with a notification regarding a detected discrepancy. In some implementations, the vehicle operator may be requested to confirm, e.g., in response to the presented notification, whether the detected discrepancy appears legitimate. In some implementations, a reviewer (e.g., a user of remote computing server 142) may be requested to confirm, e.g., in response to the presented notification, whether the detected discrepancy appears legitimate (e.g., based on review of recorded video information). In some implementations, the vehicle operator may request that a reviewer (e.g., a user of remote computing server 142) confirms, e.g., in response to a presented notification, whether the detected discrepancy appears legitimate. For example, the vehicle operator may think a detected discrepancy is inaccurate, and request someone review recently captured information, such as the past one, two, or three minutes of road-side image information. In some implementations, presentation component 130 may be configured to facilitate presentation of user interfaces, reports, and/or results to users, third parties, and/or vehicle operators. By way of non-limiting example, user interface 45 in FIG. 4 may include a notification and/or presentation of a detected speed limit, such as the posted speed limit of 55 mph through first sign 41a. As depicted in FIG. 4, user interface 45 may also present other information, such as current speed, status of the current traffic, status of the local road surface, and/or other information.

Referring to FIG. 1, in some implementations, presentation component 130 may facilitate presentation of a user interface to a user of the remote computing server. In some implementations, presentation component 130 may facilitate presentation of one or more user interfaces to one or more vehicle operators. In some implementations, presentation component 130 may facilitate presentation of one or more reports, results, and/or user interfaces to a third party.

Interface component 132 may be configured to facilitate interaction between system 100 and one or more users, including but not limited to a vehicle operator. For example, interface component 132 may facilitate interaction through user interfaces (such as user interface 107). For example, interface component 132 may receive user input through user interfaces (such as user interface 107). In some implementations, the interface component may receive user input from the user of a remote computing server. In some implementations, interface component 132 may receive user input from vehicle operators, e.g., through user interface 107. In some implementations, interface component 132 may receive user input from a third party.

Local event component 134 may be configured to detect vehicle events, including but not limited to speeding events. In some implementations, vehicle events may be related to current operating conditions of a vehicle. In some implementations, vehicle events may be related to the surroundings of a vehicle. In some implementations, vehicle events may be related to the operator of a vehicle. For example, a vehicle event may be based on comparing one or more vehicle parameters with one or more thresholds. In some implementations, detections may be based on definitions and/or representations of vehicle events, actions and/or conditions of vehicle operators, and/or vehicle maneuvers that are included in executable code. For example, particular executable code may include a definition for the detection of an event that represents an inattentive vehicle operator. Such executable code may be distributed across a fleet of vehicles, and results from the detection of an occurrence of the event that represents an inattentive vehicle operator may be transferred to remote computing server 142, and presented to a user and/or third party. For example, particular executable code may include a definition for the detection of an event that represents a fuel-inefficient maneuver of a vehicle. Such executable code may be distributed across a fleet of vehicles, and results from the detection of an occurrence of the event that represents a fuel-inefficient maneuver may be transferred to remote computing server 142, and presented to the third party.

In some implementations, local event component 134 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Local event component 134 may be configured such that force maintained over a period of time at a particular vehicle speed may decrease a threshold force the longer that the force is maintained. Local event component 134 may be configured such that, combined with engine load data, throttle data may be used to determine a risky event, a fuel wasting event, and/or other events. In some implementations, detections of specific driving maneuvers, such as speeding, may be overridden based on recently identified posted speed limits, recent modifications of the centralized database, and/or other information.

Examples of interface devices suitable for inclusion in a user interface (such as user interface 107) include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as user interface 107. Other exemplary input devices and techniques adapted for use by users and/or vehicle operators include, but are not limited to, an RS-232 port, RF link, an IR link, modem (telephone, cable, and/or other modems), a cellular network, a Wi-Fi network, a local area network, and/or other devices and/or systems. In short, any technique for communicating information is contemplated by the present disclosure as user interface 107.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers. For example, contextual information related to weather conditions may be received from a particular external provider that provides weather information. For example, contextual information related to road surface conditions may be received from a particular external provider that provides road condition information. For example, contextual information related to traffic conditions may be received from a particular external provider that provides traffic information. In some implementations, external resources 136 include one or more external providers.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

Figure 5:
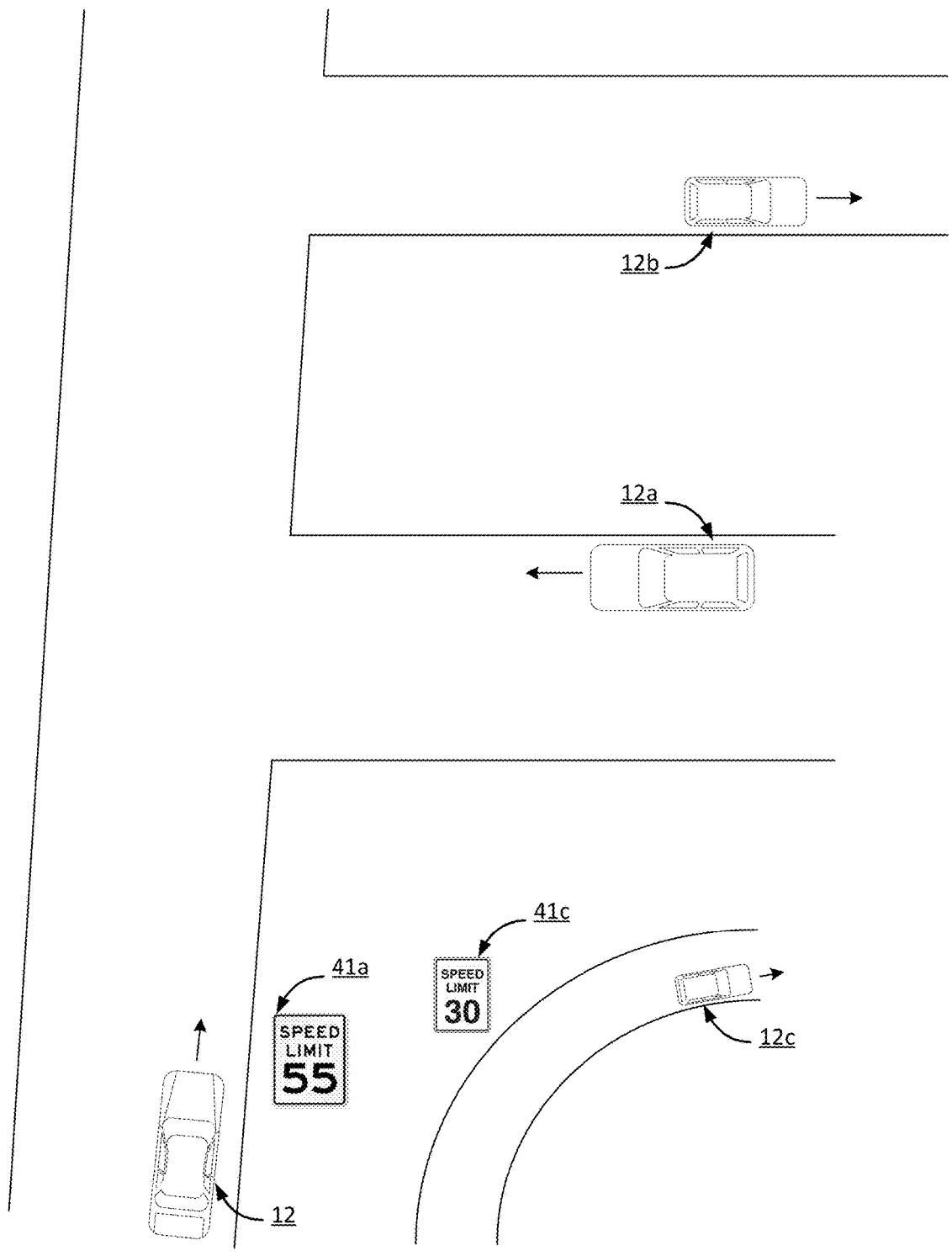
FIG. 5 illustrates a scenario in which a system can be used that is configured to determine and/or compare posted speed limits for vehicles and modify a centralized database of posted speed limits, in accordance with one or more embodiments.

In some implementations, database transmission component 112 may be configured to transmit at least a portion of the centralized database of posted speed limits, in particular a portion that includes one or more recently modified speed limits, to one or more transceivers that are coupled to vehicles that have not yet received an update for the part of the centralized database that includes recently modified speed limits. By way of non-limiting example, FIG. 5 illustrates a scenario 50 in which system 100 can be used. For example, in scenario 5, vehicle 12 has detected a posted speed limit of 55 by virtue of a first sign 41a near the road. For example, the posted speed limit of 55 mph may be higher than the speed limit in the centralized database for the same road. Scenario 50 further includes a second vehicle 12a, a third vehicle 12b, and a fourth vehicle 12c, all traveling in the direction as indicated by an arrow near the front of the respective vehicles. In some implementations, database transmission component 112 may be configured to transmit at least the updated posted speed limit of 55 mph to one or more other vehicles based on their respective proximity to the current location of vehicle 12 and/or first sign 41a. For example, the updated posted speed limit of 55 mph may be transmitted to second vehicle 12a and fourth vehicle 12c based on proximity. In some implementations, database transmission component 112 may be configured to transmit an update to one or more other vehicles based on whether they are expected to soon be near the current location of vehicle 12 and/or first sign 41a. In such a case, the updated posted speed limit of 55 mph may be transmitted to second vehicle 12a based on expected future needs, but not to fourth vehicle 12c.

Referring to FIG. 1, electronic storage 138 may include electronic storage media that electronically stores information. The electronic storage media of electronic storage 138 may include one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 138 may store software algorithms, recorded video event data, information determined by processor 140, information received via user interface 107, and/or other information that enables system 100 to function properly. Electronic storage 138 may be (in whole or in part) a separate component within system 100, or electronic storage 138 may be provided (in whole or in part) integrally with one or more other components of system 100.

As described above, processor(s) 140 may be configured to provide information-processing capabilities in system 100. As such, processor(s) 140 may include one or more of a digital processor, an analog processor, a digital circuit designed to process information, an analog circuit designed to process information, a state machine, and/or other mechanisms for electronically processing information. Although processor 140 is shown in FIG. 1 as a single entity, this is for illustrative purposes only. In some implementations, processor 140 may include a plurality of processing units. These processing units may be physically located within the same device (e.g., a vehicle event recorder), or processor 140 may represent processing functionality of a plurality of devices operating in coordination.

Processor(s) 140 may be configured to execute components 110-134 by software; hardware; firmware; some combination of software, hardware, and/or firmware; and/or other mechanisms for configuring processing capabilities on processor 140. It should be appreciated that although components 110-134 are illustrated in FIG. 1 as being co-located within a single processing unit, in implementations in which processor 140 includes multiple processing units, one or more of components 110-134 may be located remotely from the other components. The description of the functionality provided by the different components 110-134 described herein is for illustrative purposes, and is not intended to be limiting, as any of components 110-134 may provide more or less functionality than is described. For example, one or more of components 110-134 may be eliminated, and some or all of its functionality may be provided by other components 110-134. As another example, processor 140 may be configured to execute one or more additional components that may perform some or all of the functionality attributed below to one of components 110-134.

Figure 2:
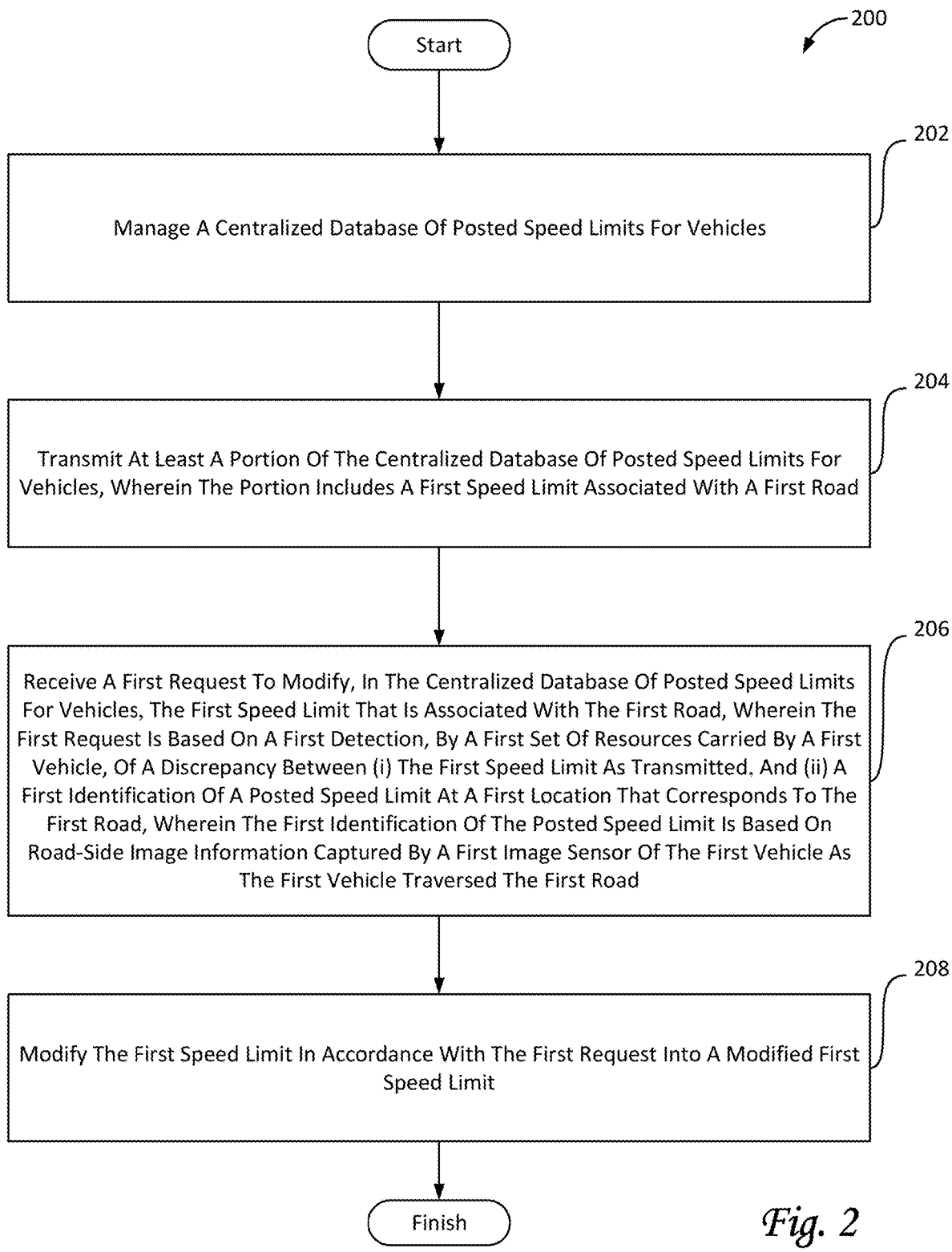
FIGS. 2-3 illustrate methods to determine and/or compare posted speed limits for vehicles and modify a centralized database of posted speed limits, in accordance with one or more embodiments.
Figure 3:
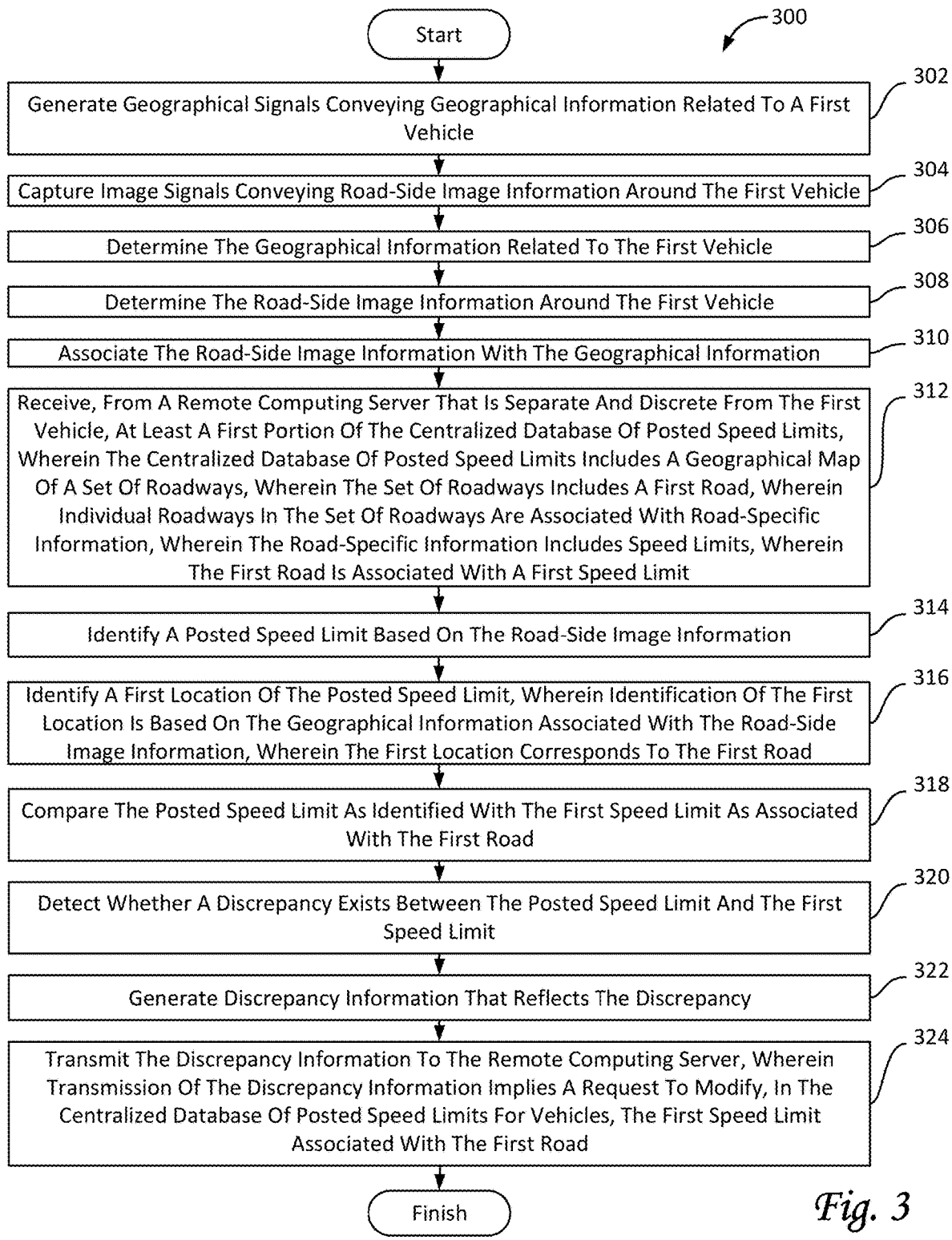

FIGS. 2-3 illustrate methods 200-300 to determine and/or compare posted speed limits for vehicles and modify a centralized database of posted speed limits. The operations of methods 200-300 presented below are intended to be illustrative. In some implementations, methods 200-300 may be accomplished with one or more additional operations not described, and/or without one or more of the operations discussed. Additionally, the order in which the operations of methods 200-300 are illustrated (in FIGS. 2-3) and described below is not intended to be limiting. In some implementations, two or more of the operations may occur substantially simultaneously.

In some implementations, methods 200-300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200-300 in response to instructions stored electronically on one or more electronic storage mediums. The one or more processing devices may include one or more devices configured through hardware, firmware, and/or software to be specifically designed for execution of one or more of the operations of methods 200-300.

Referring to FIG. 2 and method 200, at an operation 202, a centralized database of posted speed limits for vehicles is managed. The centralized database of posted speed limits includes a geographical map of a set of roadways. The set of roadways includes a first road. Individual roadways in the set of roadways are associated with road-specific information. The road-specific information includes speed limits. The first road is associated with a first speed limit. In some embodiments, operation 202 is performed by a database management component the same as or similar to database management component 110 (shown in FIG. 1 and described herein).

At an operation 204, at least a portion of the centralized database of posted speed limits for vehicles is transmitted to a first transceiver coupled to the first vehicle. The portion includes the first speed limit associated with the first road. In some embodiments, operation 204 is performed by a database transmission component the same as or similar to database transmission component 112 (shown in FIG. 1 and described herein).

At an operation 206, a first request is received to modify, in the centralized database of posted speed limits for vehicles, the first speed limit that is associated with the first road. The first request is based on a first detection, by a first set of resources carried by the first vehicle, of a discrepancy between (i) the first speed limit as transmitted, and (ii) a first identification of a posted speed limit at a first location that corresponds to the first road. The first set of resources includes a first image sensor configured to capture road-side image information around the first vehicle and a first user interface configured to receive user input from the first vehicle operator. The first identification of the posted speed limit is based on at least one of (i) the road-side image information captured by the first image sensor of the first set of resources as the first vehicle traversed the first road, and (ii) the user input received from the first vehicle operator through the first user interface. In some embodiments, operation 206 is performed by a modification request component the same as or similar to modification request component 114 (shown in FIG. 1 and described herein).

At an operation 208, responsive to receipt of the first request to modify the first speed limit that is associated with the first road, the first speed limit is modified in accordance with the first request into a modified first speed limit. In some embodiments, operation 208 is performed by a database modification component the same as or similar to database modification component 116 (shown in FIG. 1 and described herein).

Referring to FIG. 3 and method 300, at an operation 302, geographical signals are generated, by a geolocation sensor carried by the first vehicle, the geographical signals conveying geographical information related to the first vehicle. In some embodiments, operation 302 is performed by a sensor the same as or similar to sensor 108 (shown in FIG. 1 and described herein).

At an operation 304, image signals are captured, by an image sensor carried by the first vehicle, the image signals conveying road-side image information around the first vehicle. In some embodiments, operation 304 is performed by a sensor the same as or similar to sensor 108 (shown in FIG. 1 and described herein).

At an operation 306, the geographical information related to the first vehicle is determined. The geographical information is based on the geographical signals. In some embodiments, operation 306 is performed by a parameter determination component the same as or similar to parameter determination component 122 (shown in FIG. 1 and described herein).

At an operation 308, the road-side image information around the first vehicle is determined. The road-side image information is based on the image signals. In some embodiments, operation 308 is performed by a parameter determination component the same as or similar to parameter determination component 122 (shown in FIG. 1 and described herein).

At an operation 310, the road-side image information is associated with the geographical information. In some embodiments, operation 310 is performed by a parameter determination component the same as or similar to parameter determination component 122 (shown in FIG. 1 and described herein).

At an operation 312, at least a first portion of the centralized database of posted speed limits is received, from a remote computing server that is separate and discrete from the first vehicle. The centralized database of posted speed limits includes a geographical map of a set of roadways. The set of roadways includes a first road. Individual roadways in the set of roadways are associated with road-specific information. The road-specific information includes speed limits. The first road is associated with a first speed limit. In some embodiments, operation 312 is performed by a local database component the same as or similar to local database component 124 (shown in FIG. 1 and described herein).

At an operation 314, a posted speed limit is identified. Identification of the posted speed limit may be based on the road-side image information. In some embodiments, operation 314 is performed by a local identification component the same as or similar to local identification component 126 (shown in FIG. 1 and described herein).

At an operation 316, a first location of the posted speed limit is identified. Identification of the first location is based on the geographical information associated with the road-side image information. The first location corresponds to the first road. In some embodiments, operation 316 is performed by a local identification component the same as or similar to local identification component 126 (shown in FIG. 1 and described herein).

At an operation 318, the posted speed limit as identified is compared with the first speed limit as associated with the first road. In some embodiments, operation 318 is performed by a discrepancy component the same as or similar to discrepancy component 128 (shown in FIG. 1 and described herein).

At an operation 320, whether a discrepancy exists between the posted speed limit and the first speed limit is detected. Detection is based on the comparison. In some embodiments, operation 320 is performed by a discrepancy component the same as or similar to discrepancy component 128 (shown in FIG. 1 and described herein).

At an operation 322, responsive to the discrepancy existing, discrepancy information is generated that reflects the discrepancy. In some embodiments, operation 322 is performed by a discrepancy component the same as or similar to discrepancy component 128 (shown in FIG. 1 and described herein).

At an operation 324, the discrepancy information is transmitted to the remote computing server. Transmission of the discrepancy information implies a request to modify, in the centralized database of posted speed limits for vehicles, the first speed limit associated with the first road. In some embodiments, operation 324 is performed by a discrepancy component the same as or similar to discrepancy component 128 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to compare posted speed limits for vehicles and modify a centralized database of posted speed limits, the system configured to couple with a first vehicle that is operated by a first vehicle operator, the system comprising:

a set of sensors configured to generate output signals conveying vehicle operation information related to operation of the first vehicle;

a geolocation sensor carried by the first vehicle, wherein the geolocation sensor is configured to generate geographical signals conveying geographical information related to the first vehicle;

an image sensor carried by the first vehicle, wherein the image sensor is configured to capture image signals conveying road-side image information around the first vehicle;

a first transceiver carried by the first vehicle, wherein the first transceiver is configured to transfer and receive information to and from the first vehicle and a remote computing server that is separate and discrete from the first vehicle; and one or more processors configured via machine-readable instructions to:

determine the vehicle operation information, wherein determination is based on the generated output signals;

determine a current speed of the first vehicle, wherein the current speed is determined based on the determined vehicle operation information;

determine the geographical information related to the first vehicle, wherein the geographical information is based on the geographical signals;

determine the road-side image information around the first vehicle, wherein the road-side image information is based on the image signals;

associate the road-side image information with the geographical information;

receive, from the remote computing server that is separate and discrete from the first vehicle, at least a first portion of the centralized database of posted speed limits, wherein the centralized database of posted speed limits includes a geographical map of a set of roadways, wherein the set of roadways includes a first road and a second road, wherein individual roadways in the set of roadways are associated with road-specific information, wherein the road-specific information includes speed limits, wherein the first road is associated with a first speed limit, wherein the second road is associated with a second speed limit;

detect vehicle events, wherein detection is based on the vehicle operation information, wherein the vehicle events include a first speeding event that is detected based on a comparison of the current speed of the first vehicle and the first speed limit;

identify a posted speed limit, wherein identification of the posted speed limit is based on the road-side image information; identify a first location of the posted speed limit, wherein identification of the first location is based on the geographical information associated with the road-side image information, wherein the first location corresponds to the first road;

compare the posted speed limit as identified with the first speed limit as associated with the first road;

detect whether a discrepancy exists between the posted speed limit and the first speed limit, wherein detection is based on the comparison;

responsive to the discrepancy not existing, generate and store a vehicle event record related to the first speeding event;

responsive to the discrepancy existing, generate discrepancy information that reflects the discrepancy;

responsive to the discrepancy existing, determine whether the first speeding event occurred based on a second comparison of the current speed of the first vehicle and the posted speed limit as identified;

responsive to the second comparison indicating the first speeding event occurred, generate and store a second vehicle event record related to the first speeding event;

make a first determination whether the first vehicle is within a particular proximity of the second road;

responsive to the first determination being affirmative, make a second determination whether recently determined information suggests the first vehicle is actually traversing the second road instead of the first road, wherein the recently determined information includes the determined geographical information and the determined current speed of the first vehicle;

responsive to the second determination being affirmative, alleviate one or more consequences of the detection of the first speeding event; and responsive to the second determination being negative and further responsive to the discrepancy existing, transmit, through the first transceiver, the discrepancy information to the remote computing server, wherein transmission of the discrepancy information implies a request to modify, in the centralized database of posted speed limits for vehicles, the first speed limit associated with the first road.

2. The system of claim 1, further comprising: a user interface configured to receive user input from the first vehicle operator wherein the one or more processors are further configured via machine-readable instructions to: responsive to the discrepancy existing, generate a notification for the first vehicle operator, wherein the notification includes a request for the first vehicle operator to confirm the posted speed limit at the first location; present the notification to the first vehicle operator; and receive a response to the notification from the first vehicle operator, wherein the response is received through the user interface; wherein the transmission of the discrepancy information occurs responsive to the response being affirmative.

3. The system of claim 1, wherein the response received from the first vehicle operator through the user interface is voice-based.

4. A method for comparing posted speed limits for a fleet of vehicles and modifying a centralized database of posted speed limits, wherein the fleet of vehicles includes a first vehicle operated by a first vehicle operator, the method comprising:

generating, by a set of sensors, output signals conveying vehicle operation information related to operation of the first vehicle;

generating, by a geolocation sensor carried by the first vehicle, geographical signals conveying geographical information related to the first vehicle;

capturing, by an image sensor carried by the first vehicle, image signals conveying road-side image information around the first vehicle;

determining the vehicle operation information, wherein determination is based on the generated output signals;

determining a current speed of the first vehicle, wherein the current speed is determined based on the determined vehicle operation information;

determining the geographical information related to the first vehicle, wherein the geographical information is based on the geographical signals;

determining the road-side image information around the first vehicle, wherein the road-side image information is based on the image signals;

associating the road-side image information with the geographical information;

receiving, from a remote computing server that is separate and discrete from the first vehicle, at least a first portion of the centralized database of posted speed limits, wherein the centralized database of posted speed limits includes a geographical map of a set of roadways, wherein the set of roadways includes a first road and a second road, wherein individual roadways in the set of roadways are associated with road-specific information, wherein the road-specific information includes speed limits, wherein the first road is associated with a first speed limit, wherein the second road is associated with a second speed limit;

detecting vehicle events, wherein detection is based on the vehicle operation information, wherein the vehicle events include a first speeding event that is detected based on a comparison of the current speed of the first vehicle and the first speed limit;

identifying a posted speed limit, wherein identification of the posted speed limit is based on the road-side image information;

identifying a first location of the posted speed limit, wherein identification of the first location is based on the geographical information associated with the road-side image information, wherein the first location corresponds to the first road;

comparing the posted speed limit as identified with the first speed limit as associated with the first road;

detecting whether a discrepancy exists between the posted speed limit and the first speed limit, wherein detection is based on the comparison;

responsive to the discrepancy not existing, generate and store a vehicle event record related to the first speeding event;

responsive to the discrepancy existing, generating discrepancy information that reflects the discrepancy;

responsive to the discrepancy existing, determining whether the first speeding event occurred based on a second comparison of the current speed of the first vehicle and the posted speed limit as identified;

responsive to the second comparison indicating the first speeding event occurred, generate and store a second vehicle event record related to the first speeding event;

making a first determination whether the first vehicle is within a particular proximity of the second road;

responsive to the first determination being affirmative, making a second determination whether recently determined information suggests the first vehicle is actually traversing the second road instead of the first road, wherein the recently determined information includes the determined geographical information and the determined current speed of the first vehicle;

responsive to the second determination being affirmative, alleviating one or more consequences of the detection of the first speeding event; and responsive to the second determination being negative and further responsive to the discrepancy existing, transmitting, through the first transceiver, the discrepancy information to the remote computing server, wherein transmission of the discrepancy information implies a request to modify, in the centralized database of posted speed limits for vehicles, the first speed limit associated with the first road.

5. The method of claim 4, further comprising: responsive to the discrepancy existing, generating a notification for the first vehicle operator, wherein the notification includes a request for the first vehicle operator to confirm the posted speed limit at the first location; presenting the notification to the first vehicle operator; and receiving, through a user interface, a response to the notification from the first vehicle operator; wherein the transmission of the discrepancy information occurs responsive to the response being affirmative.

6. The method of claim 4, wherein the response received from the first vehicle operator through the user interface is voice-based.

* * * * *